Nov 2, 1937.  C. A. CAMPBELL  2,097,964
AIR BRAKE
Filed Feb. 25, 1937   2 Sheets-Sheet 2
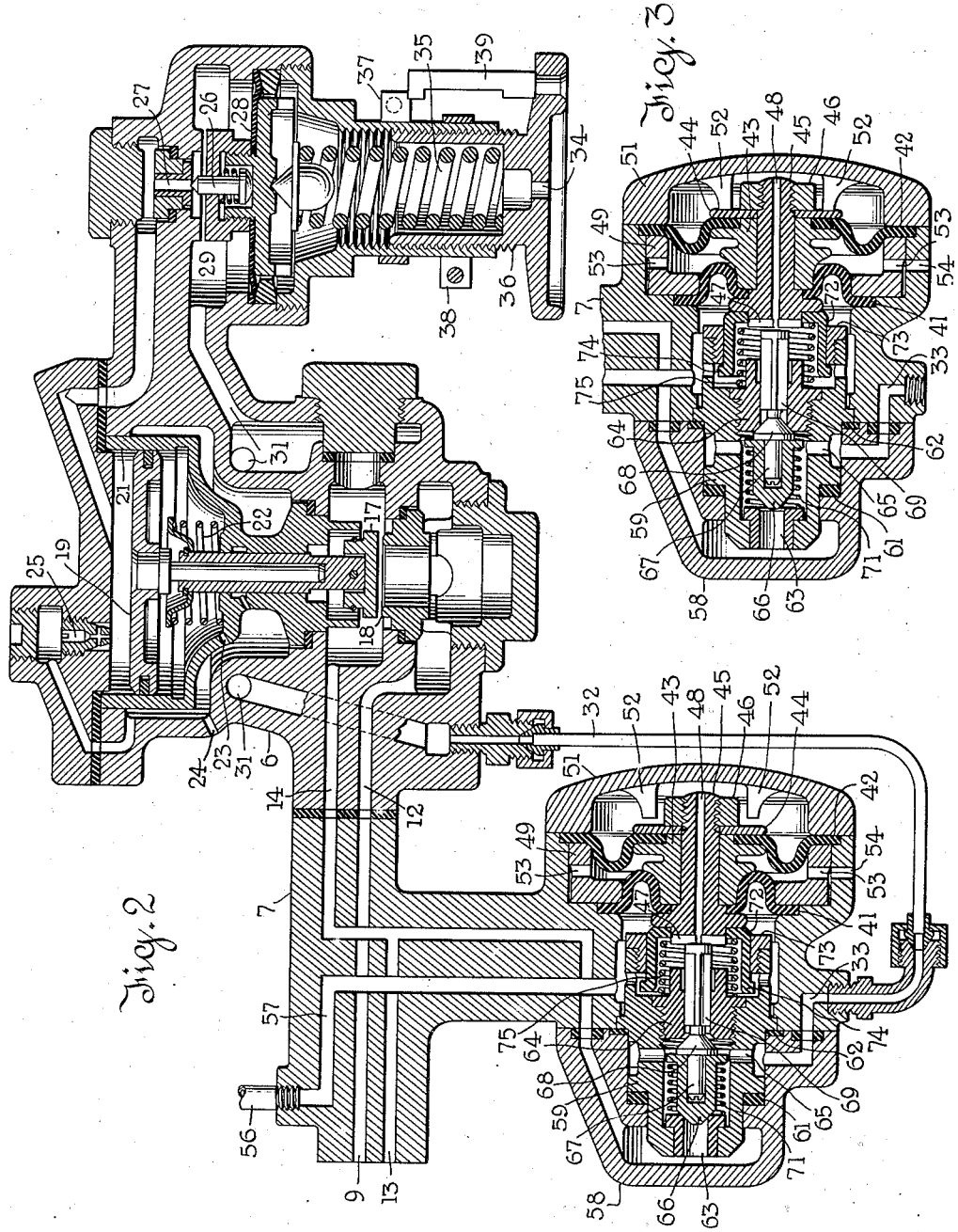

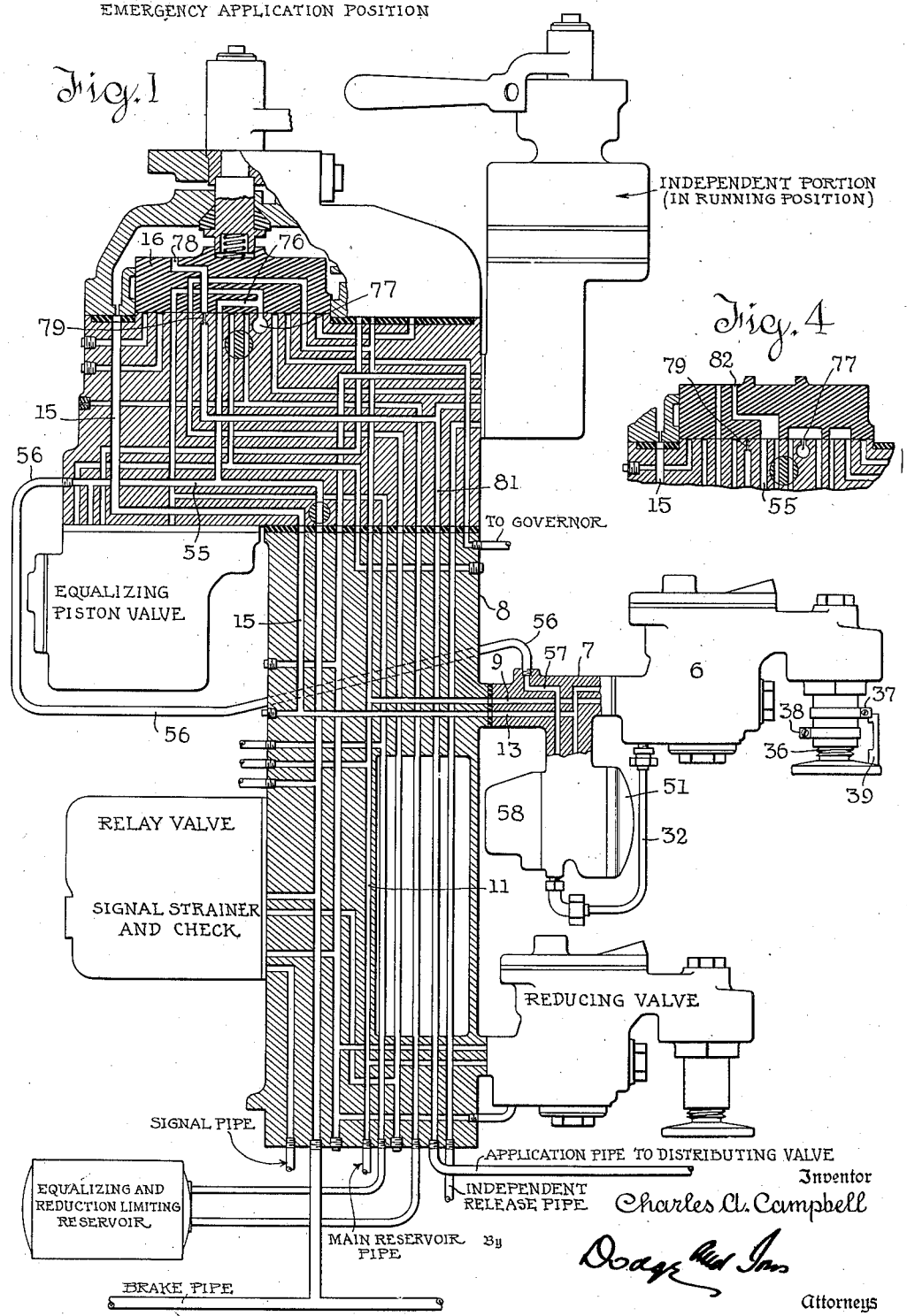

Patented Nov. 2, 1937

2,097,964

UNITED STATES PATENT OFFICE 2,097,964

AIR BRAKE

Charles A. Campbell, Watertown, N. Y., assignor to The New York Air Brake Company, a corporation of New Jersey Application February 25, 1937, Serial No. 127,734

17 Claims. (Cl. 303—59)

This invention relates to feed valve mechanisms for air brake systems, and particularly to means for shifting the control point of the feed valve from a point at or close to the outlet of the feed valve (for example) to some more remote point, such as a point in the brake pipe.

While this general system of shifting control is believed to be available in a number of relations, the invention can be simply explained with reference to a particular commercial feed valve, (model F) and to a particular locomotive brake equipment, (8—ET). The invention will be described as so embodied, first, as the basis for broad claims to the concept of shifting control, irrespective of the particular embodiment, and, second, as basis for specific claims to the embodiment in the 8—ET system, for which the invention was developed, and in which it has especial utility.

The model F feed valve embodies substantially the disclosure of the patent to Campbell, No. 1,781,747, granted Nov. 18, 1930. It has two important and distinctive operative characteristics, (1) the controlling element responds to pressure at a point remote from the inlet and outlet of the valve (a feature known in the art as "remote control") and (2) if the controlling pressure falls sensibly below the control point, the valve opens wide.

The advantages of these characteristics, particularly with conventional locomotive equipment, such as the 6—ET, are fully set forth in the above patent and need be restated only generally. They are, elimination of disturbing effect of throttling in the engineer's brake valve, and rapid feeding flow, particularly during releases with the engineer's brake valve in running position.

In the 8—ET equipment, the feed valve supplies all air to the space above the rotary valve of the engineer's brake valve, this being a decided departure from the former universal practice of supplying main reservoir air directly to this space. This arrangement gives to the feed valve certain new functions, notably, the supply of air to and through the rotary valve of the engineer's brake valve in emergency applications. The air so supplied passes by way of the application pipe to the application cylinder and excess air is vented therefrom through a safety valve usually set at 68 pounds. The relative rates of supply and venting determine the pressure developed in the application cylinder, and consequently the related pressure developed in the locomotive brake cylinders. In emergency applications the brake pipe is vented, and hence, if a model F feed valve be used with 8—ET equipment and conventionally connected, it opens wide in emergency and puts main reservoir pressure in the rotary valve.

Aside from the excessive, and excessively variable emergency applications thus produced in the locomotive under the above circumstances, there is another disadvantage. The locomotive application is not adjusted in intensity in consonance with the brake pipe pressure which the feed valve is from time to time adjusted to maintain (say 70 pounds in freight and 110 pounds in passenger service).

The present invention solves this problem by shifting the control point of the feed valve. In emergency the control point is shifted to the outlet of the feed valve, so that depletion of brake pipe pressure has no effect in regulation. At all other times the control point is at a point in the brake pipe, thus securing, particularly during releases, the recognized advantages of remote control and wide opening in response to low pressure. The preferred means for effecting the shift is a device which responds to depletion of brake pipe pressure below a value low enough to be reached only in emergency.

The invention will now be described with reference to the accompanying drawings, in which,—

Fig. 1 is a view, chiefly in vertical section, of the 8—ET engineer's brake valve pedestal, showing the rotary valve in emergency application position, and showing a model F feed valve with control point shifter applied according to the invention.

Fig. 2 is a diagrammatic section of the model F feed valve connected with control point shifter, the latter being positioned as it is in all conditions except emergency applications, so that brake pipe pressure exercises control.

Fig. 3 is a fragmentary view similar to a portion of Fig. 2, but showing the control point shifter positioned as it is in emergency applications, so that pressure at the discharge of the feed valve exercises control.

Fig. 4 is a fragmentary view similar to a portion of Fig. 1, showing the rotary valve in running position.

In the drawings the porting is conventionalized to bring all ports into a single plane. Fig. 1, except for the inclusion of the present invention, is the same as the corresponding portion of Plate 6 of The New York Air Brake Co. Instruction Pamphlet No. 5032—1, May, 1935, entitled "No. 8—ET Locomotive Brake Equipment." Reference may be made to this publication for information as to the distributing valve and other related apparatus.

Referring first to Figs. 1 and 2, the body of the feed valve is generally indicated at 6 and the adapter bracket of the control point shifter at 7. The bracket 7 is interposed between the body 6 of the feed valve and the pedestal 8 of the brake valve (see Fig. 1) and contains a passage 9 forming a connection between the main reservoir passage 11 of the pedestal and the main reservoir supply passage 12 of the feed valve. The bracket also contains a passage 13 forming a connection between the discharge passage 14 of the feed valve and the passage 15 in the pedestal 8 which leads to the space above the rotary valve 16 of the engineer's brake valve.

In practice the ports 9 and 13 in bracket 7 are designed to correct the reverse arrangement of the ports 12 and 14 in the commercial model F feed valve with respect to the ports 9 and 15 of the commercial 8—ET pedestal which was designed for use with a Westinghouse commercial feed valve known as the model M. This reverse arrangement of ports as between model M and model F feed valves is discussed in detail in the patent to Campbell, No. 1,752,631, April 1, 1930, which relates to an adapter reversible to receive either valve. In the present case no provision to receive the model M feed valve is needed, because that valve has no provision for remote control and such control is functionally involved in the present invention.

The feed valve, shown in Fig. 2, requires only brief description. Flow through the valve from main reservoir passage 12 to outlet passage 14 is controlled by valve 17 coacting with seat 18. A piston 19 in cylinder bushing 21, moves the valve 17 in a closing direction against the resistance of spring 22 in response to pressure developed in the upper face of piston 19. The lower face is subject to atmospheric pressure by way of vents 23 and 24.

Pressure fluid from the space above piston 19 is vented to atmosphere at a restricted rate determined by choke 25 which leads to vent 24. The rate of supply is determined by the throttling effect of pin valve 26 on flow through seat 27. Pin valve 26 is carried by a flexible diaphragm assembly generally indicated at 28, and subject on its upper side to the pressure of fluid arriving from the control point. In Patent 1,781,747, this control point was a connection with the brake pipe below the engineer's brake valve, but according to the present invention, the control point is normally that just mentioned; but shifts in emergency applications to a point near the discharge of the valve 17, specifically a point in passage 13.

To effect this shift by mechanism carried by bracket 7, the space 29 above diaphragm 28 is connected by a cored passage 31 in body 6 and by pipe 32 with a passage 33 in bracket 7.

The space below diaphragm 28 is vented to atmosphere at 34, and the diaphragm is urged upward in a valve closing direction (as to valve 26) by a coil compression spring 35. The stress on spring 35 is adjustable manually by turning the threaded spring seat 36. Adjustable stops 37 and 38, respectively, define the high setting (usually 110 pounds gauge for passenger service) and the low setting (usually 70 pounds gauge for freight service) by arresting a finger 39 carried by the spring seat 36.

Rising pressure, acting on diaphragm 28, forces it downward, opening valve 26. The resulting increase of pressure on piston 19 moves valve 17 in a closing direction. The reverse occurs on fall of pressure.

The right hand face of bracket 7 is counterbored to receive a differential diaphragm unit made up of a small flexible diaphragm 41, a large diaphragm 42 (conveniently twice the area of diaphragm 41) a center spacer 43, and a clamp ring 44, all mounted on and clamped together by an axially ported bolt 45 with nut 46. At the head end (left in Figs. 2 and 3) cross slots 47 give free flow to the axial port 48 in bolt 45. The peripheries of the diaphragms 41, 42 are spaced by ring 49 and clamped by cap 51, which is attached by any suitable means such as cap screws (not shown).

Lugs 52 engage ring 44 to limit the outward motion of the diaphragm assembly and ports 53 in ring 49 and 54 in bracket 7 vent the space between the diaphragms 41, 42 to atmosphere. The outer face of the large diaphragm and the inner face of the small diaphragm are subject to equal pressures because of the presence of slots 47 and bore 48, so that rising pressure acting on these faces of the diaphragms will produce an increasing inward force on the assembly. The pressure which so acts is brake pipe pressure conducted from brake pipe port 55 in pedestal 8 (Fig. 1) via remote control pipe 56 and passage 57 in bracket 7.

It follows that when brake pipe is vented the diaphragm assembly is balanced as to pressure and hence inert. On rising brake pipe pressure it develops an increasing inward force.

Clamped between body 7 and a cap 58 is a filler piece 59 sealed to cap and body by gaskets 61, 62. Filler piece 59 forms a valve chamber in axial alignment with bolt 45. At its outer (left) end, it has a port into which is pressed valve seat 63. Threaded into filler piece 59 and opposed to seat 63 is a second valve seat and valve guide 64. Seat 63 controls communication with a branch of outlet passage 13. Seat 64 controls communication with brake pipe port 57. The space between the seats 63, 64 is connected by port 65 in filler piece 59 with port 33 and hence with control-diaphragm chamber 29.

Mounted between seats 63 and 64 and shorter than the interval between them is a double beat valve assembly comprising a flanged cup-like poppet valve 66 telescoping over a stem 67 on the back of the oppositely arranged poppet valve 68. Valve 68 is guided by a fluted stem or pilot 69 formed integrally therewith and axially slidable in the combined seat and guide 64. The stem 69 enters into thrust relation with the inner end of bolt 45. A spring 71 reacts against the flange of valve 66 to urge this valve in an opening direction and valve 68 in a closing direction.

To guide the diaphragm assembly and to facilitate assembly a cup 72 is mounted to slide axially in bushing 73 which is threaded into the right hand end of filler piece 59. The cup is flanged at 74 so that bushing 73 limits its motion to the right under the urge of diaphragm loading spring 75. An aperture in cup 72 embraces a boss on the head of the bolt 45 as shown and thus centers the bolt and the diaphragms which it carries.

The strength of spring 75 is such that when brake pipe pressure is below the lowest value likely to be reached in service, say at 35 pounds gage, the spring will force diaphragms 41, 42 to the right. This permits valve 68 to close and valve 66 to open, connecting chamber 29 with port 13 and thus establishing outlet pressure control (see Fig. 3). At pressures above this value the diaphragms will overpower the spring, opening valve 68 and closing valve 66 so that chamber 29 is remotely connected with brake pipe passage 55 via passage 31, pipe 32, passage 33, port 65, passage 57 and remote control pipe 56.

The importance of substituting discharge pressure control for remote brake pipe pressure control during emergency can now be set forth in greater detail. In emergency position of the rotary valve 16 of Fig. 1, port 76 in the rotary valve connects brake pipe port 55 with exhaust port 77. This and the resulting response of emergency vent valves reduce brake pipe pressure to atmospheric, so that if brake pipe pressure remained in control valve 17 would open wide and stay open, admitting main reservoir pressure to the space above rotary valve 16.

In emergency position port 78 in the rotary valve admits air through restriction 79 to the application port 81. Restriction 79 is dimensioned on the basis of feed valve pressure, and consequently the feed valve should control the pressure above rotary valve 16. Restriction 79 cannot be so well dimensioned on the basis of main reservoir pressure because this varies quite widely, particularly where duplex governor tops are used. The invention secures outlet pressure control in emergency position when alone it is advantageous, and still gives the desirable characteristics secured by remote control at all other times, particularly during releases.

Fig. 4, which shows running position is included to indicate one of the positions in which the rotary valve feeds air to the brake pipe and in which the remote control is effective to govern the feed valve. In this figure brake pipe port 55 is disconnected from exhaust port 77 and receives air from the feed valve via passage 15 and port 82 formed in the rotary valve 16.

An important advantage secured by the invention is that the adjustment of the feed valve for freight and passenger service affects the intensity of emergency applications on the locomotive, in a commensurate degree. This follows from the fact that in emergency position of the engineer's brake valve the rate at which air is supplied to the application pipe is a function of the setting of the feed valve. Consequently, when the feed valve is set for a relatively low pressure, as it is in freight braking, an emergency application on the locomotive will be less severe than it is when the feed valve is set for the relatively higher value used in passenger service. Heavy emergency applications on the locomotive are permissible with the relatively short passenger trains but undesirable with the long freight trains, particularly with delayed build-up and with the characteristically large slack action permitted by commercial draft rigging.

While one embodiment of the invention has been described in considerable detail, this is intended to be illustrative and not limiting. In the first place, the broad concept of transferring the point of control is believed to be new and generally useful. In the second place, while the plan of shifting this control in response to brake pipe pressure is believed to be the best available scheme in the air brake art, and particularly in connection with the standardized units such as the 8—ET pedestal, it is recognized that various other means might be used to shift the double-beat poppet valve 66, 68, and this possibility is fully recognized. Further, the invention is not limited to the 8—ET equipment, but may be found desirable with any equipment in which the feed valve supplies air to the rotary valve.

Fig. 1 shows in considerable detail the porting of the 8—ET pedestal. Only those ports which are directly involved in the function of the invention have been specifically described in the specification. Many of these are, however, identified by a legend on the drawings and will be readily recognized by persons skilled in the art.

What is claimed is,—

1. A brake system comprising in combination a source of high pressure air; an engineer's brake valve; a brake pipe in which pressure varies through release, running, service and emergency ranges under control of said engineer's brake valve; a feed valve which supplies air to the system under control of said brake valve; and means controlled at least in part by said brake valve for subjecting said feed valve to control by pressure at its discharge in the emergency range, and to control by brake pipe pressure in the release running and service ranges.

2. A brake system comprising in combination a source of high pressure air; an engineer's brake valve; a brake pipe in which pressure varies through release, running, service and emergency ranges under control of said engineer's brake valve; a feed valve which supplies air to the system under control of said brake valve; and means responsive to brake pipe pressure for subjecting said feed valve to control by brake pipe pressure in the release, running and service ranges, and to control by its own discharge pressure in the emergency range.

3. The combination of a feed valve device including a flow controlling valve, and a pressure responsive device arranged to actuate said valve; and means operable selectively to subject said pressure responsive device to pressure at the discharge side of said valve and at a point remote therefrom.

4. The combination of a feed valve device including a flow controlling valve, and a pressure responsive device arranged to actuate said valve; and means operable selectively to subject said pressure responsive device to pressure at two points remote from each other, one of which is adjacent said valve.

5. The combination of an engineer's brake valve; a brake pipe; a feed valve normally controlled by brake pipe pressure and controlling air supplied to the engineer's brake valve; and means rendered effective by the engineer's brake valve when in emergency position, to subject said feed valve to control by pressure at its outlet.

6. The combination of a feed valve device including a flow controlling valve, and a pressure responsive device arranged to actuate said valve; a brake pipe; another pipe; an engineer's brake valve having at least two positions, in the first of which it supplies air from the feed valve to the brake pipe, and in the second of which it vents the brake pipe and supplies air from the feed valve to said other pipe; and means controlled at least in part by the position of said brake valve and effective in said first position to subject said responsive device to brake pipe pressure, and in said second position to a pressure adjacent the discharge of the flow controlling valve.

7. The combination of a feed valve device including a flow controlling valve device including a flow controlling valve, and a pressure responsive device arranged to actuate said valve; a brake pipe; another pipe; an engineer's brake valve having at least two positions, in the first of which it supplies air from the feed valve to the brake pipe, and in the second of which it vents the brake pipe and supplies air from the feed valve to said other pipe; and means controlled at least in part by the position of said brake valve and effective in said first position to subject said responsive device to brake pipe pressure, and in said second position to a pressure independent of brake pipe pressure.

8. The combination of an automatic air brake system including an engineer's brake valve, brake pipe and feed valve, said feed valve being normally controlled by brake pipe pressure; and means responsive to brake pipe pressure, and effective when said pressure is reduced to produce an emergency application, to subject said feed valve to control by its outlet pressure.

9. The combination with an automatic air brake system of the type in which an engineer's brake valve controls the pressure in a brake pipe and in emergency position vents the brake pipe and supplies air directly to an application pipe; of a feed valve which supplies air to said brake valve including the air so directly supplied, said feed valve including a pressure responsive controlling element normally subject to brake pipe pressure; and means responsive to an emergency reduction of brake pipe pressure to subject said element to pressure in the outlet of said feed valve.

10. The combination of an engineer's brake valve; a brake pipe; a feed valve normally controlled by brake pipe pressure and controlling the air supplied to the brake valve; and means responsive to brake pipe pressure and effective at pressures lower than substantially the lowest brake pipe pressures used in service applications, to subject said feed valve to control by the pressure at its outlet.

11. The combination of an air brake system including a brake pipe; a feed valve having a pressure responsive controlling element; and means responsive to brake pipe pressure serving as such pressure passes respectively above and below a chosen value to subject said controlling element selectively to brake pipe pressure, and to pressure on the outlet side of the feed valve.

12. The combination of a brake system including a brake pipe; a feed valve including a pressure-responsive controlling element, adapted to supply air to said system; and means responsive to brake pipe pressure and rendered effective by changes therein to subject said controlling element selectively to pressures at different points in said system.

13. The combination of a brake system including a brake pipe; a feed valve including a pressure-responsive controlling element, adapted to supply air to said system; and means responsive to brake pipe pressure and rendered effective by changes therein to subject said controlling element selectively to pressures at different points in said system, one of which is relatively remote from said feed valve as compared with the other.

14. The combination of a brake system including a brake pipe; a feed valve including a pressure-responsive controlling element, adapted to supply air to said system; and means responsive to brake pipe pressure and rendered effective by changes therein to subject said controlling element selectively to pressures at different points in said system, one of which is brake pipe pressure at a point relatively remote from said valve.

15. The combination of a brake system including a brake pipe; a feed valve including a pressure-responsive controlling element, adapted to supply air to said system; and means responsive to brake pipe pressure and rendered effective by changes therein to subject said controlling element selectively to pressures at different points in said system, one of which is pressure at the outlet of said feed valve, and the other of which is brake pipe pressure at a point relatively remote from said feed valve.

16. In an automatic air brake system, the combination of a brake pipe; an application pipe; an engineer's brake valve which feeds air to the brake pipe in at least one brake-releasing position, and in an emergency position vents the brake pipe and feeds air to said application pipe; a feed valve which controls the supply to the engineer's brake valve of the air so fed, said feed valve including a pressure responsive controlling element, normally subject to brake pipe pressure; and means responsive to reduction of brake pipe pressure to an emergency value to subject said controlling element to the pressure of feed valve discharge.

17. In a brake system the combination of a brake pipe; a high pressure air supply; a pressure reducing feed valve having a definite control setting adapted to supply air from said supply to said system, said feed valve being normally subject to control by brake pipe pressure, and being of the type which opens wide to supply pressure fluid without substantial pressure reduction when the controlling pressure falls sensibly below its control setting; and means effective when brake pipe pressure is below a chosen value abnormally lower than said control setting, to suspend control by brake pipe pressure and subject the feed valve to control by pressure adjacent its discharge.

CHARLES A. CAMPBELL.